Figure 1:
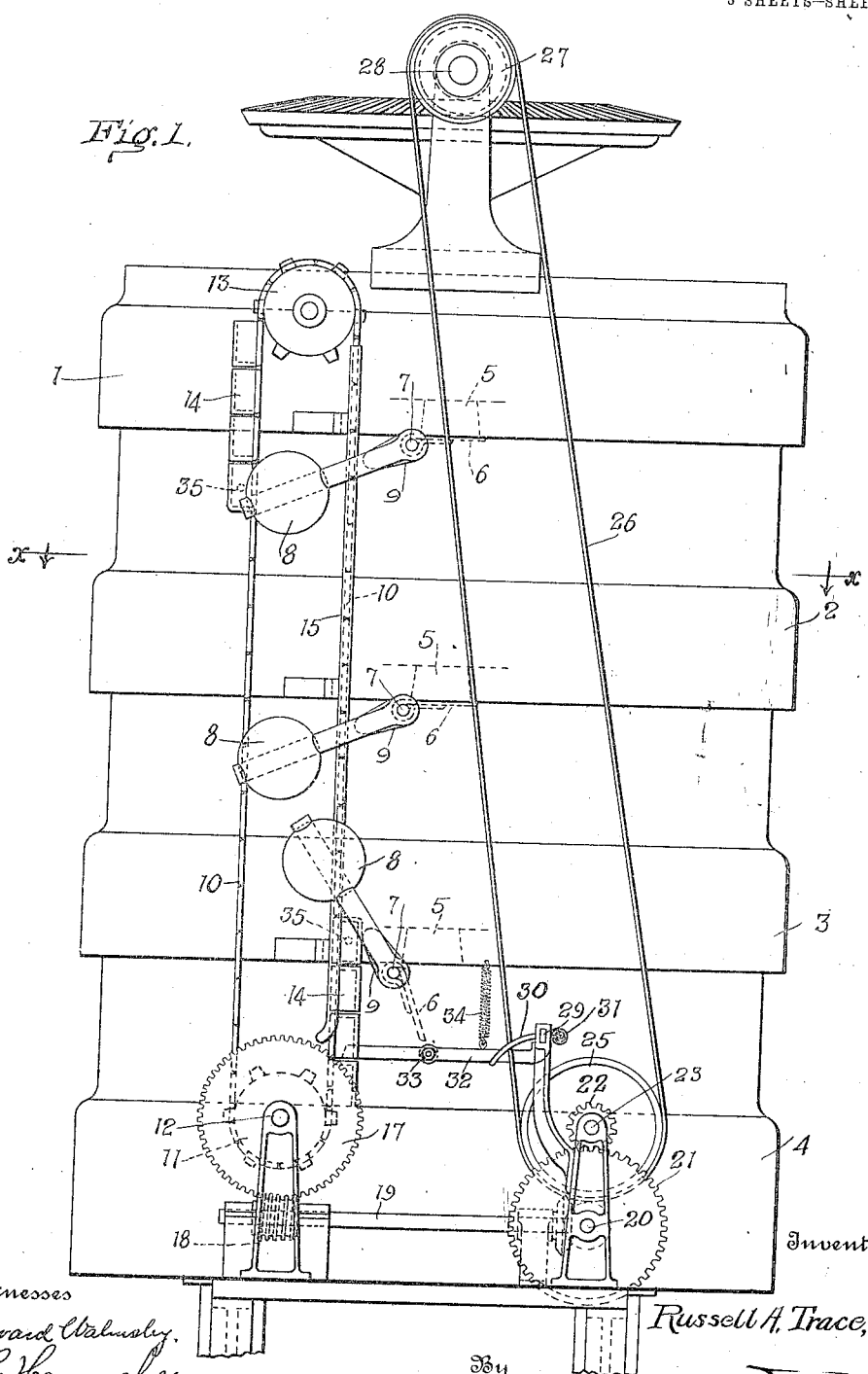

R. A. TRACE.
GATE CONTROLLING DEVICE FOR COOKERS.
APPLICATION FILED APR. 13, 1914.

1,115,133.

Patented Oct. 27, 1914.
3 SHEETS—SHEET 1.

Witnesses
G. Howard Walmsley
C. L. Hammaker

Inventor
Russell A. Trace,
By
Toulmin Reed & Toulmin
Attorneys

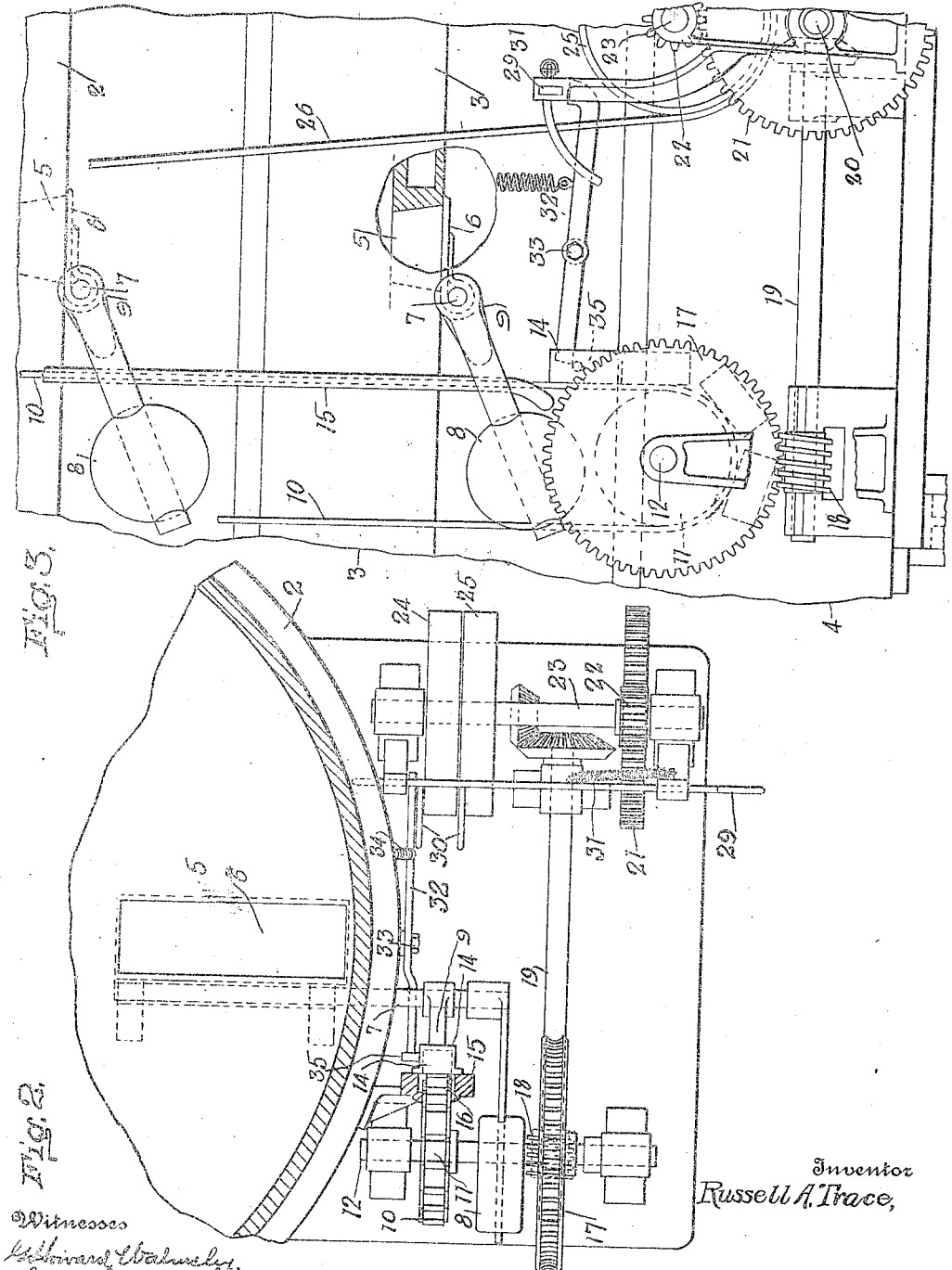

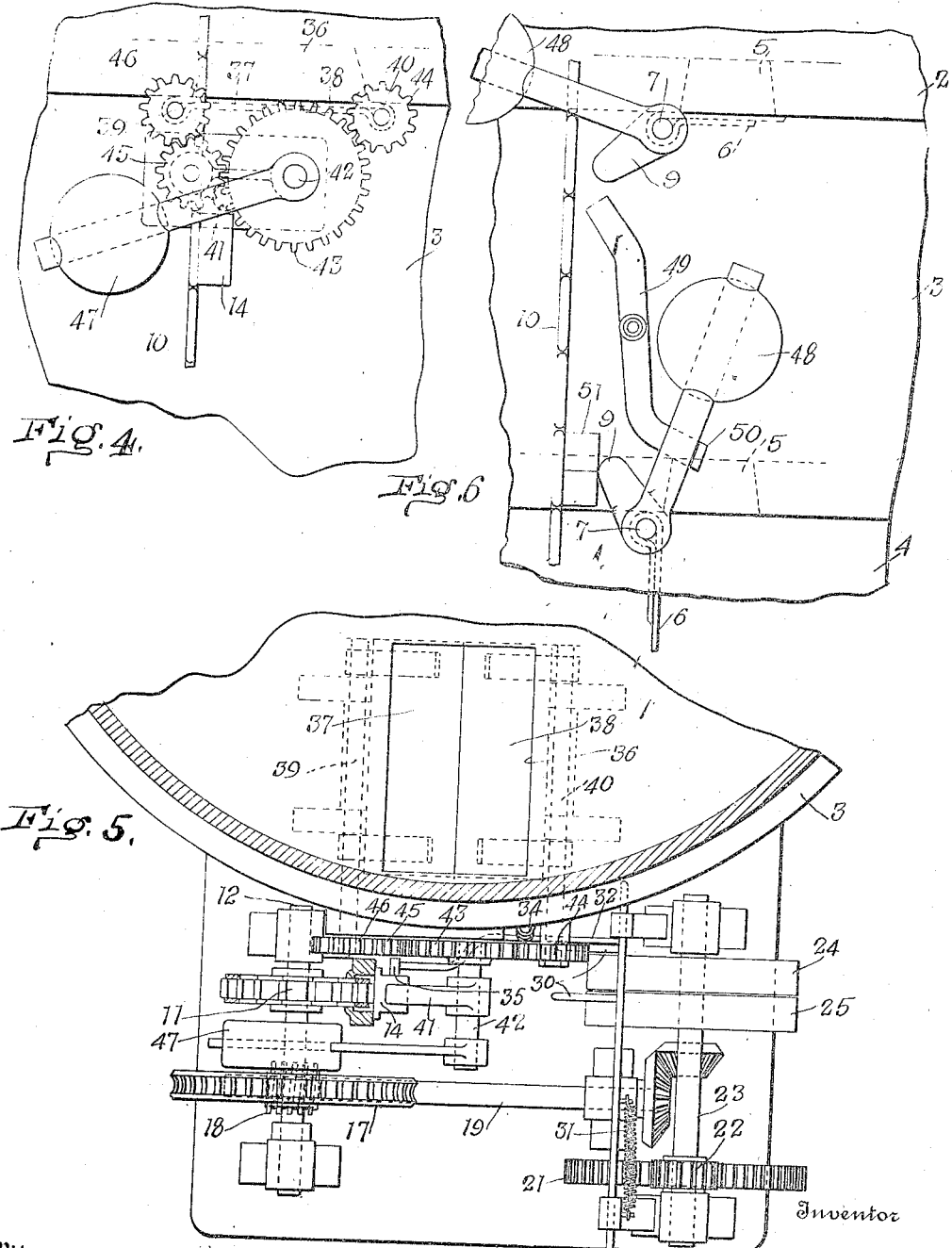

UNITED STATES PATENT OFFICE.

RUSSELL A. TRACE, OF DAYTON, OHIO, ASSIGNOR TO BUCKEYE IRON AND BRASS WORKS, OF DAYTON, OHIO, A CORPORATION OF OHIO.

GATE-CONTROLLING DEVICE FOR COOKERS.

1,115,133.  Specification of Letters Patent.  Patented Oct. 27, 1914.

Application filed April 13, 1914. Serial No. 831.448.

*To all whom it may concern:*

Be it known that I, RUSSELL A. TRACE, a citizen of the United States, residing at Dayton, in the county of Montgomery and State of Ohio, have invented certain new and useful Improvements in Gate-Controlling Devices for Cookers, of which the following is a specification, reference being had therein to the accompanying drawing.

This invention relates to gate controlling devices for cookers, such as are employed in treating seeds and the like preparatory to expressing the oil therefrom; and is in the nature of an improvement upon the device shown and described in the application for patent filed by C. H. Fulson April 13, 1914, Ser. No. 831,447, and assigned to the Buckeye Iron and Brass Works, assignee of the present invention.

The object of the invention is to provide a controlling device for automatically opening the gates in a prescribed order and in timed relation; which will be very simple in its construction, inexpensive to build; and which can be maintained and operated at a low cost.

A further object of the invention is to provide such a device which can be applied to existing cookers and driven from the mechanism of those cookers.

In the accompanying drawings, Figure 1 is a side elevation of a cooker showing my invention applied thereto; Fig. 2 is a horizontal sectional view taken on the line *x x* of Fig. 1, looking in the direction of the arrows and showing the belt shifting devices in plan; Fig. 3 is a side elevation of the lower portion of the mechanism showing the controlling device in its starting position; Fig. 4 is a side elevation showing a slightly modified form of the device; Fig. 5 is a plan view of the modification shown in Fig. 4; and Fig. 6 is a detail of a further modification of the gate actuating devices.

In these drawings I have illustrated one embodiment of my invention and have shown the same as applied to a four-high cooker of a known construction. This construction comprises the usual cooking receptacles or kettles, which are indicated by the reference numerals 1, 2, 3 and 4. Each of the upper kettles, 1, 2, and 3, is provided in its bottom wall, which wall also forms the top of the next lower kettle, with a discharge opening 5 leading to the receptacles 2, 3 and 4, respectively. The lower receptacle 4 is adapted to discharge into a cake former or other suitable depository, but as this forms no part of the invention the discharge opening therefor is not shown. Likewise, the upper receptacle 1 is adapted to be filled from an overhead source of supply, but as this is not a part of the invention it has not been illustrated. Each of the discharge openings 5 is controlled by a gate 6 which is mounted for movement to open and close the discharge opening and in the present form of the invention is mounted at one edge upon a shaft 7 mounted on the bottom of the cooker alongside the opening 5 and projecting beyond the side wall of the cooker where it is provided with a counterweight 8. In the present arrangement of the mechanism the counterweight holds the gate normally closed and an actuating device, such as a rock arm 9, is provided to rock the shaft and move the gate against the action of the counterweight. A suitable controlling device is provided to cause the several gates to be opened and closed in a prearranged order and to be retained in their open positions for a predetermined period of time. This device preferably comprises a vertically movable member carrying means for successively engaging the actuating members of the respective gates, moving these gates into their open positions and retaining them in those positions until the controlling device is advanced a distance sufficient to release them. The length of time that each gate is held open is determined by the speed at which the controlling device moves. In the present instance the means for actuating the gates comprises a single tripping member which is moved successively into engagement with each of the rock arms. I prefer that the movable member of the controlling device should be of a flexible nature and, in the present instance, I have shown the same as comprising an endless belt, such as a sprocket chain 10 extending about a sprocket wheel 11 on a shaft 12, mounted near the bottom of the cooker, and about a second sprocket wheel 13 mounted near the top of the cooker. The tripping member, which is indicated at 14, comprises a series of blocks mounted upon the endless belt and arranged close together in longitudinal alinement so as to form a practically continuous tripping block but one which can pass about the sprocket wheels. Arranged alongside of the endless belt is a guide bar 15 which is preferably provided with a groove 16 to receive the belt or sprocket chain and which serves to hold the latter against transverse movement when the tripping block engages one of the rock arms. Further, the flanges at the sides of the groove serve to prevent the lateral displacement of the belt. I prefer to provide the endless belt with two tripping blocks spaced equal distances apart so that when one block has completed its upward movement the other block will be approaching its operative position with the rock arm for the lower gate.

The controlling member may be driven in any suitable manner. In the present instance, the shaft 12 which carries the lower sprocket wheel 11 is provided with a worm gear 17 meshing with a worm 18 on a shaft 19 which, in turn, is geared to a shaft 20 having thereon a gear 21 meshing with a pinion 22 on a shaft 23 which carries a bevel gear and idler 24 and 25, respectively. A belt 26 connects the pulley 24 with a second pulley 27 mounted on a shaft 28 forming a part of or connected with the operating mechanism for the cooker, which is of a well known type. It is preferable that the movement of the controlling device should be automatically interrupted at the end of each complete operation thereof so that there will be no danger of the gate of the cooker 3 being opened before the lowermost cooker 4 has been emptied. To accomplish this I have provided an automatic belt shifting device which is controlled by the controlling device and serves to interrupt the application of power to the latter. As here shown the belt shifting device comprises a sliding rod 29 extending parallel with the shaft 23 and having a fork 30 engaging opposite sides of the belt. A spring 31 tends to move the rod in a direction to move the belt onto the idler. The rod, however, is held normally against movement by means of a latch 32 which engages a notch in one end of the rod 29 and holds the same normally against movement under the tension of the spring 31. The latch 32 is pivoted between its ends, as shown at 33, and is held normally in engagement with the rod 29 by means of a spring 34. That end of the latch opposite the rod 29 lies adjacent to the path of the tripping blocks 14 and the foremost section of each block is provided with a lateral projection, such as a pin 35 adapted to engage the end of the latch 32, disengage the same from the rod 29 and permit the spring to shift the belt. It will be noted by reference to Fig. 3 that this pin is so arranged that the latch will be tripped to shift the belt when the end of the tripping block is close to the rock arm 9 of the lowermost gate 6. Consequently, when the lower receptacle has been emptied the belt will be shifted by hand to the drive pulley 24 and the tripping block will be quickly brought into engagement with the rock arm to open the lower gate 6, thus placing the mechanism in operation without unnecessary loss of time.

In the mechanism above described the rock arm or actuating member for the gate is shown as mounted on the shaft to which the gate is secured, but it will be understood that this is not a necessary construction and that the rock arm or other actuating member may be mounted independently of the gate and connected thereto through suitable connecting devices. This is sometimes desirable as, for instance, in the case of large cookers where the discharge openings are of such a size as to make it preferable to provide two gates for each opening instead of a single gate, as in the mechanism above described. Such a double gate mechanism is shown in Figs. 4 and 5. In these figures the cooker is shown as provided with a discharge opening 36 controlled by two gates 37 and 38, these gates being mounted, respectively, on shafts 39 and 40 mounted along the opposite edges of the discharge opening. An actuating member which, in this instance, however, is in the form of a trip arm, is shown at 41 and is mounted on a stud shaft 42 journaled in a suitable bearing on the side of the cooker and having its end arranged in the path of the tripping block 14. This rock arm is so connected with the shafts 39 and 40 as to move these shafts simultaneously in opposite directions and the mechanism here shown for this purpose comprises gearing, a large gear 43 being rigidly connected with the rock arm 41 and meshing with a gear 44 secured to the shaft 40 and with an idle gear 45 which, in turn, meshes with a gear 46 secured to the shaft 39. Thus, it will be obvious that the upward movement of the rock arm will simultaneously open the two gates and that the movement of the gates toward their closed positions under the influence of the counterweights, which are shown at 47, will return the rock arm to its normal position, as shown in full lines in Fig. 4.

In the mechanism which has been heretofore described the gates are moved into their open positions and held in those positions by the continuous contact of the rock arm with the tripping block. It will be understood, however, that the gates can be moved into their open positions by contact of the tripping block with the rock arm, or other actuating device and held in that position by some means other than the tripping block and subsequently released and closed. This construction is not only a possible one but under certain conditions may be preferable to that above described. In Fig. 6 of the drawings I have illustrated one form of apparatus by means of which this result can be accomplished. In this figure the cooker receptacle and its gate are similar to those shown in Figs. 1, 2 and 3 and the actuating device is of the same type as that shown in those figures, that is, it comprises a rock arm mounted on the shaft of the gate. The counterweight 48, however, occupies a different position from that shown in those figures. It is so arranged that when the gate is moved from its closed position to its open position the weight will be carried across its center of gravity and will tend to hold the gate open until sufficient force is applied thereto to again move the weight across its center of gravity. Means are provided to be actuated by the controlling member for so moving the weight as to cause it to close the gate. As here shown this means comprises a lever 49 pivotally mounted adjacent to the position occupied by the weight when the gate is open, and having a lip 50 adapted to extend across the arm carrying the weight. The opposite end of the lever projects into the path of the tripping block of the controlling member and when engaged by this tripping block will rock the weight about its axis to carry it across its pivotal center and cause it to close the gate. The mechanism is of an exceedingly simple character and is very positive in its operation. The arrangement has various advantages, among which is the ability of the gate to close at any time should undue pressure be exerted thereon, as by the filling of the lower receptacle into which the gate extends. The seeds or meal in this lower receptacle are constantly in motion and there is danger of the gate being broken if held rigidly in its open position. The use of this device enables the tripping block to be very materially shortened. In fact, it need be nothing more than a lug, although I have, in the present instance, shown the same at 51 as comprising two short sections connected to the chain and movable relatively one to the other to pass about the sprocket wheels. The upper end of the trip lever 49 is arranged close to the actuating device or rock arm of the gate next below it, thus causing this gate to be opened immediately upon the closing of the lower gate.

The operation of the device will be readily understood from the foregoing description and it will be apparent that the device is of a very simple, inexpensive character, yet positive in its operation and insures that the gates will be actuated successively in a prearranged order and that each gate will be held open a predetermined length of time.

While I have shown and described one embodiment of the invention and modifications thereof it will be understood that these have been chosen for the purposes of illustration only and that I do not desire to be limited to the details of construction shown and described, for obvious modifications will occur to a person skilled in the art.

Having thus fully described my invention what I claim as new and desire to secure by Letters Patent, is:—

1. In a cooker, the combination, with a plurality of receptacles, each upper receptacle having a discharge opening leading to the next lower receptacle, gates to control the respective discharge openings, and actuating devices for imparting movement to said gates, of a controlling device comprising a vertically movable member, and a part carried by said member to successively engage the actuating device for each of said gates to quickly open that gate and to remain in operative engagement with said actuating device to retain the gate in its open position for a period of time.

2. In a cooker, the combination, with a plurality of receptacles, each upper receptacle having a discharge opening leading to the next lower receptacle, gates to control the respective discharge openings, and actuating devices for imparting movement to said gates, of a controlling device comprising a vertically movable member, and a tripping block adapted to successively engage the actuating device for each of said gates.

3. In a cooker, the combination, with a plurality of receptacles, each upper receptacle having a discharge opening leading to the next lower receptacle, gates to control the respective discharge openings, and actuating devices for imparting movement to said gates, of a controlling device comprising a flexible member supported adjacent to said cooker, means for imparting lengthwise movement to said flexible member, and a tripping block carried by said flexible member.

4. In a cooker, the combination, with a plurality of receptacles, each upper receptacle having a discharge opening leading to the next lower receptacle, gates to control the respective discharge openings, and actuating devices for imparting movement to said gates, of a controlling device comprising a flexible member supported adjacent to said cooker, means for imparting lengthwise movement to said flexible member, and a tripping block carried by said flexible member and comprising a series of sections arranged in alinement lengthwise of said flexible member and presenting a continuous surface to said actuating devices.

5. In a cooker, the combination, with a plurality of receptacles, each upper receptacle having a discharge opening leading to the next lower receptacle, gates to control the respective discharge openings, and actuating devices for imparting movement to said gates, of a controlling device comprising an endless belt mounted adjacent to said cooker for vertical movement and a flexible tripping block carried by said endless belt and arranged to successively engage each of said actuating devices for said gates.

6. In a cooker, the combination, with a plurality of receptacles, each upper receptacle having a discharge opening leading to the next lower receptacle, gates to control the respective discharge openings, and actuating devices for imparting movement to said gates, of a controlling device comprising an endless belt mounted adjacent to said cooker for vertical movement, and an elongated tripping block carried by said endless belt and comprising a series of parts arranged in longitudinal alinement and capable of movement relatively one to the other as said belt passes about its support.

7. In a cooker, the combination, with a plurality of receptacles, each upper receptacle having a discharge opening leading to the next lower receptacle, gates to control the respective discharge openings, and actuating devices for imparting movement to said gates, of a controlling device comprising a flexible member mounted adjacent to said cooker for vertical movement, a guide bar arranged adjacent to and parallel with said flexible member on that side thereof opposite the actuating devices for said gates, and a tripping block carried by said flexible member on that side thereof opposite said guide bar.

8. In a cooker, the combination, with a plurality of receptacles, each upper receptacle having a discharge opening leading to the next lower receptacle, gates to control the respective discharge openings, and actuating devices for imparting movement to said gates, of a controlling device comprising an endless sprocket chain, a guide bar arranged parallel with said chain and having a groove to receive the same, and a flexible tripping block carried by that side of said chain adjacent to the open side of said groove.

9. In a cooker, the combination, with a plurality of receptacles arranged one above the other, each upper receptacle having a discharge opening leading to the next lower receptacle, gates to control the respective receptacles, and actuating devices operatively connected with the respective gates, of a controlling device comprising an endless belt, a plurality of tripping devices mounted on said belt, spaced equal distances apart, each of said tripping devices being adapted to successively engage the actuating devices for each of said gates, means actuated by said endless belt to interrupt the movement thereof after one of said tripping blocks has passed the uppermost gate-actuating device and before the next following tripping block has engaged the lowermost gate-actuating device.

10. In a cooker, the combination, with a plurality of receptacles arranged one above the other, each upper receptacle having a discharge opening leading to the next lower receptacle, gates to control the respective receptacles, and actuating devices operatively connected with the respective gates, of a controlling device comprising an endless belt, driving mechanism therefor comprising a belt, a belt shifting device connected with said belt, and means actuated by said controlling device for causing said belt shifting device to operate.

11. In a cooker, the combination, with a plurality of receptacles arranged one above the other, each upper receptacle having a discharge opening leading to the next lower receptacle, gates to control the respective receptacles, and actuating devices operatively connected with the respective gates, of a controlling device comprising an endless belt, a tripping block carried thereby, an actuating device for said endless belt comprising a driving belt, a mechanical belt-shifting device, a latch to hold said belt-shifting device normally against movement, and means controlled by said controlling device to trip said latch.

12. In a cooker, the combination, with a plurality of receptacles arranged one above the other, each upper receptacle having a discharge opening leading to the next lower receptacle, a plurality of gates to control each of said discharge openings, and actuating devices for imparting movement simultaneously to the gates for the respective discharge openings, of a controlling device comprising a flexible member supported adjacent to said cooker, means for imparting lengthwise movement to said flexible member, and a tripping block carried by said flexible member.

13. In a cooker, the combination, with a plurality of receptacles arranged one above the other, each upper receptacle having a discharge opening leading to the next lower receptacle, a plurality of gates to control each of said discharge openings, and actuating devices for imparting movement simultaneously to the gates for the respective discharge openings, of a controlling device comprising a flexible member supported adjacent to said cooker, means for imparting lengthwise movement to said flexible member, and a flexible tripping device carried by said flexible member and coöperating with said actuating devices to open the respective gates and retain the same in their open positions for a period of time.

14. In a cooker, the combination, with a plurality of receptacles arranged one above the other, each upper receptacle having a discharge opening leading to the next lower receptacle, a plurality of gates to control each of said discharge openings, and actuating devices for imparting movement simultaneously to the gates for the respective discharge openings, of a controlling device comprising a vertically movable member, and a part carried by said member to successively engage the actuating devices for the several gates and remain in operative engagement with said actuating devices for a period of time to retain the gates in their open positions for such period of time.

15. In a cooker, the combination, with a plurality of receptacles arranged one above the other, each upper receptacle having a discharge opening leading to the next lower receptacle, and gates to control the respective discharge openings, of mechanical means to individually actuate said gates to move them into their open positions, and means to hold said gates in said open positions until positively actuated to release the same.

16. In a cooker, the combination, with a plurality of receptacles arranged one above the other, each upper receptacle having a discharge opening leading to the next lower receptacle, and gates to control the respective discharge openings, of a counterweight connected with each of said gates and so arranged that when the gate is moved to its open position said counterweight will be carried across its center of gravity, and mechanical means for actuating said gate and said counterweight.

17. In a cooker, the combination, with a plurality of receptacles arranged one above the other, each upper receptacle having a discharge opening leading to the next lower receptacle, gates to control the respective discharge openings, and actuating devices for imparting movement to said gates, of a controlling device having means to engage said actuating devices to cause said gates to be moved to their open positions, means to hold said gates in their open positions, and devices adapted to be actuated by said controlling device to cause said gates to be released and moved into their closed positions.

18. In a cooker, the combination, with a plurality of receptcles arranged one above the other, each upper receptacle having a discharge opening leading to the next lower receptacle, gates to control the respective discharge openings, and actuating devices for imparting movement to said gates, of a controlling device comprising a movable member having a tripping block adapted to successively engage the actuating devices for said gates to cause said gates to be moved into their open positions, means to hold the respective gates in their open positions, and a device adapted to be actuated by the further movement of said controlling device to cause said gates to be released and moved to their closed positions.

19. In a cooker, the combination, with a plurality of receptacles arranged one above the other, each upper receptacle having a discharge opening leading to the next lower receptacle, gates to control the respective discharge openings, and actuating devices for imparting movement to said gates, of a counterweight connected with each of said gates and adapted to be moved across its center of gravity when the corresponding gate is moved from its closed to its open position, a controlling device having a part adapted to operate said actuating device, and a device mounted adjacent to the position occupied by said weight when said gate is in its open position and having a part adapted to be engaged by said controlling device and another part adapted to be moved into engagement with said weight to move the latter across its center of gravity and cause said gate to be closed.

20. In a cooker, the combination, with a plurality or receptacles arranged one above the other, each upper receptacle having a discharge opening leading to the next lower receptacle, gates to control the respective discharge openings, and actuating devices for imparting movement to said gates, of a counterweight connected with each of said gates and adapted to be moved across its center of gravity when the corresponding gate is moved from its closed to its open position, a tripping device mounted adjacent to said weight and adapted to move the same across its center of gravity to cause it to close said gate, and a controlling device adapted to first engage said actuating device to cause said gate to be opened and then to engage said tripping device to cause said gate to be closed.

21. The combination, with a cooker comprising a receptacle having a discharge opening, a gate to control said opening, and a rock arm to actuate said gate, of a counterweight connected with said gate and adapted to be moved across its center of gravity when said gate is moved from one position to the other, a tripping device mounted adjacent to the position occupied by said counterweight when the latter is in its open position, a controlling device comprising a movable member having a tripping block arranged to first engage said actuating device to cause said gate to be moved to its open position and then to engage said tripping device to move said counterweight across its center of gravity and cause said gate to be closed.

In testimony whereof, I affix my signature in presence of two witnesses.

RUSSELL A. TRACE.

Witnesses:
F. W. SCHAEFER,
H. L. HAMMAKER.